United States Patent
Theml et al.

(10) Patent No.: US 8,146,450 B2
(45) Date of Patent: Apr. 3, 2012

(54) SENSOR MOUNT, IN PARTICULAR FOR MOUNTING INTER-VEHICLE DISTANCE SENSORS ON VEHICLE COMPONENTS

(75) Inventors: Ingrid Theml, Bietigheim-Bissingen (DE); Oliver Eidel, Moeglingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 840 days.

(21) Appl. No.: 12/223,455

(22) PCT Filed: Dec. 27, 2006

(86) PCT No.: PCT/EP2006/012547
§ 371 (c)(1),
(2), (4) Date: Jul. 31, 2008

(87) PCT Pub. No.: WO2007/093214
PCT Pub. Date: Aug. 23, 2007

(65) Prior Publication Data
US 2009/0013782 A1   Jan. 15, 2009

(30) Foreign Application Priority Data
Feb. 14, 2006   (DE) .......................... 10 2006 007 710

(51) Int. Cl.
*G01D 21/00* (2006.01)

(52) U.S. Cl. ...................................... 73/866.5
(58) Field of Classification Search .................. None
See application file for complete search history.

(56) References Cited

U.S. PATENT DOCUMENTS
| | | | | |
|---|---|---|---|---|
| 4,117,718 A | * | 10/1978 | Hayward | 73/52 |
| 6,532,193 B1 | * | 3/2003 | Fehse et al. | 367/140 |
| 6,909,670 B1 | * | 6/2005 | Li | 367/140 |
| 2003/0160687 A1 | | 8/2003 | Li | |

FOREIGN PATENT DOCUMENTS
| | | |
|---|---|---|
| DE | 197 07 585 | 9/1998 |
| DE | 103 14 862 | 10/2004 |
| EP | 1 221 689 | 7/2002 |
| EP | 1 462 817 | 9/2004 |
| EP | 1 577 169 | 9/2005 |
| WO | 99/10876 | 3/1999 |

* cited by examiner

*Primary Examiner* — Robert R Raevis
(74) *Attorney, Agent, or Firm* — Paul Vincent

(57) ABSTRACT

A sensor mount (10), in particular for mounting inter-vehicle distance sensors on vehicle components, has a receptacle (12) for a sensor, wherein the receptacle has an axially front side, in the region of which the active surface of the sensor is located when the sensor is inserted into the mount, and a rear side which faces away from the front side (16). The mount comprises a cover (20) with which the rear side (16) of the receptacle (12) is covered or can be covered when a sensor is present in the mount (10) in order to attenuate sensor signals which are emitted in the rear direction and/or in order to attenuate reflection signals coming from the rear direction.

11 Claims, 1 Drawing Sheet

SENSOR MOUNT, IN PARTICULAR FOR MOUNTING INTER-VEHICLE DISTANCE SENSORS ON VEHICLE COMPONENTS

This application is the national stage of PCT/EP2006/012547 filed on Dec. 27, 2006 and also claims Paris Convention priority to DE 10 2006 007 710.5 filed Feb. 14, 2006.

BACKGROUND OF THE INVENTION

The invention relates to a sensor mount, in particular, for mounting inter-vehicle distance sensors on vehicle components, in particular, with a sleeve-shaped receptacle for a sensor, wherein the receptacle has an axially front side, in the region of which the active surface of the sensor is located when the sensor is inserted into the mount, and a rear side that faces away from the front side. Sensors to be mounted include, in particular, ultra-sound or radar sensors for sensing the environment of a vehicle. The mounts are used, in particular, for attaching sensors to the relevant vehicle parts, especially on bumpers. The vehicle components and mounts may be made of plastic.

Such sensor mounts are known, for example, from WO99/10876 AI.

During operation of the sensors mounted in the known sensor mounts, it has been shown that from time to time unwanted signals are acquired by the sensors. The object of this invention is to provide a sensor mount that minimizes the occurrence of unwanted signals as far as possible.

SUMMARY OF THE INVENTION

This object is achieved by a sensor mount as described in the introduction, which comprises a cover with which the rear side of the receptacle is covered or can be covered when a sensor is inserted in the mount for attenuating sensor signals that are emitted in the rear direction and/or for attenuating reflection signals coming from the rear direction.

This invention is based on the knowledge that the sensors contained in the sensor mounts also emit signals in the rear direction and that undesired reflection signals emanating from rear direction are received by the active surface of the sensor. Such signals that are emitted to the rear or reflection signals that emanate from the rear should, as far as possible, not be transmitted or received. To prevent emission of signals to the rear and/or to attenuate signals coming from the rear, the inventive sensor mount has a cover on the rear side of the receptacle.

In an advantageous embodiment of the invention, the cover may be flexibly attached in such a way that it opens the rear side of the receptacle to allow insertion of the sensor into the receptacle and covers the rear side when the sensor is inserted into the receptacle. With this type of sensor mount, the sensor can be inserted into the sensor mount and in the sensor mount receptacle axially from the rear. Once the sensor is in its final assembly position, the rear side of the receptacle can be closed or covered with the flexibly attached mount cover.

The cover can be attached to the receptacle, for example, by means of an elastically flexible fixing element, wherein the fixing element can be molded onto the receptacle and/or the cover. According to the invention, it is possible for the fixing element to be neither molded onto the cover nor onto the receptacle; it is then advantageously fixed to each of the individual parts.

The cover can be attached to the receptacle, in particular, by means of a hinge, in particular, by means of an integral hinge, resulting in hinged attachment to the receptacle. In this case, the integral hinge can, as already mentioned, for example, be molded onto the cover and/or to the receptacle.

The connection element may have at least one free end, on which latching elements for latch fastening with a latch engagement section on the receptacle and/or cover are provided. This has the advantage that connection by the fixing element with the receptacle and/or cover can be implemented in a simple manner. Nevertheless, a functioning captive attachment of the cover in the pre-assembly position in which the cover does not close the rear side of the receptacle is guaranteed.

According to the invention, the cover and/or receptacle may further be advantageously equipped with fixing mechanisms for permanent fixing of the cover to the rear side of the receptacle. As a consequence, the fixing mechanisms serve to fix the cover in its final assembly position, when the sensor is present in the sensor receptacle. The cover then closes the rear side of the receptacle. By fastening the cover to the rear side of the receptacle in a suitable way, the sensor can be captively mounted in the mount. This method means that other fixing means for fixing the sensor to the mount can be dispensed with.

The cover may further be advantageously attached to the receptacle by axial pretensioning. In this way, a certain sealing function can be ensured between the cover and the receptacle. For example, it can prevent dirt or moisture from entering the space between the sensor and the mount. This embodiment can also ensure that the sensor is kept in the mount by axial pretensioning.

The rear side of the receptacle can include at least two projections pointing in the axial direction, which comprise the fixing mechanisms for positioning the cover at the rear of the receptacle. This permits the cover to be positioned precisely on the rear side of the receptacle.

The fixing mechanisms are advantageously constituted as releasable or non-releasable engaging mechanisms. Releasable locking mechanisms have the advantage that the sensor positioned in the mount can be removed and replaced.

The receptacle itself is advantageously located on a fixing section of the mount which can, in particular, be fixed to part of the vehicle. According to the invention, the mount may also be fixed to a component of the vehicle as a single integral component. In particular, the receptacle can be molded as a single integral component to fit onto a vehicle component made of plastic.

According to a further advantageous embodiment of the invention, the peripheral surface of the receptacle is largely closed. This prevents signals emitted by the sensor from exiting the mount laterally and/or reflection signals from a lateral direction from reaching the sensor. In this solution, again, the measuring result of the sensor will not be adversely affected.

The peripheral surface of the receptacle can however feature a cut-out that extends in the radial direction for a connection section of the sensor. This connecting piece of the sensor then extends in a radial direction through the cut-out when the sensor is present in the mount. Electrical contact with the sensor can be made at the side adjacent to the receptacle.

The cover itself can feature, at least in sections, a circumferential contact web for making contact with the free end face of the receptacle. This provides defined contact surfaces between the cover and the end face of the receptacle.

Further details and advantageous embodiments of the invention can be seen from the following description, in which an embodiment of the invention is described and explained in more detail.

DESCRIPTION OF THE PREFERRED EMBODIMENT

Figure 1:
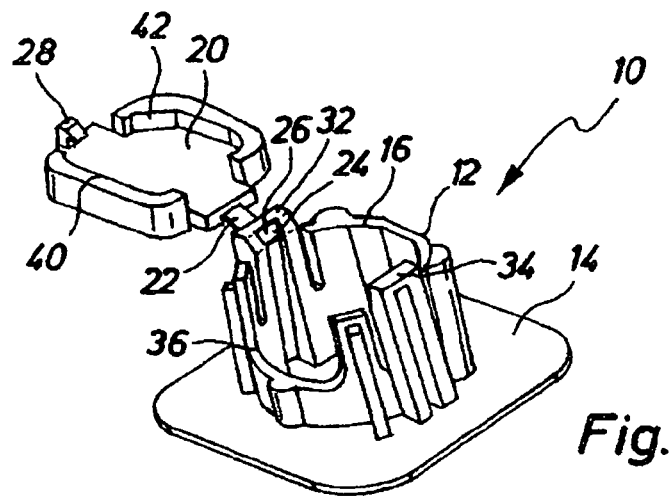
FIG. 1 an inventive sensor mount in a pre-assembly position.
Figure 2:
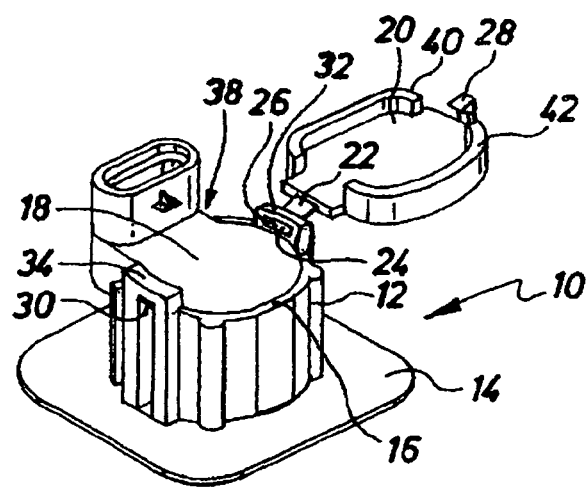
FIG. 2 the sensor mount in accordance with FIG. 1 with sensor inserted.
Figure 3:
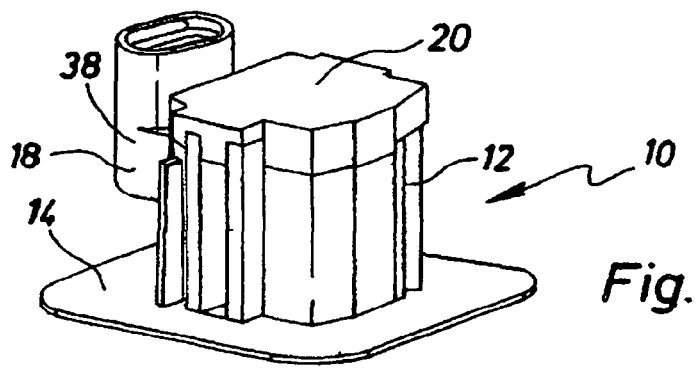
FIG. 3 the sensor mount according to FIGS. 1 and 2 in a final assembly position.

The sensor mount 10 depicted in FIGS. 1 to 3 is intended for the mounting of distance sensors on vehicle components, in particular, on bumpers. The sensor mount 10 comprises a sleeve-shaped receptacle 12, which is open on its axially front side, in the region of which the active surface is located when the sensor is inserted in the mount. There is a fixing section 14 on the radially outward facing side of the front side of the receptacle 12, which can be fixed, for example, to the vehicle component, on which the mount 10 is to be located, by adhesion or welding. The rear side 16 of the receptacle 12 is open in the axial direction in the pre-assembly position depicted in FIGS. 1 and 2. A sensor 18, depicted in FIGS. 2 and 3, can be axially introduced into the receptacle 12 from the rear.

As the figures clearly show, the mount 10 comprises a lid-like cover 20, which covers the rear side 16 of the receptacle 12 in the final assembly position, depicted in FIG. 3. The cover 20 is advantageously made of plastic and is used to attenuate sensor signals emitted in the rear direction that occur when the sensor is in operation and/or to attenuate reflection signals coming from the rear direction. It has been shown that such signals interfere with the operation of the sensor 18, which can result in an imprecise or incorrect measuring signal. By implementing the cover 20 depicted in the figures, operation of the sensors 18 is less prone to interference.

The cover 20 is located on the receptacle 12 via an elastic fixing element 22 constituted such that it is flexible. In the embodiment depicted in the figures, the fixing element 22 is molded onto the cover 20 as a type of integral hinge. The end of the fixing element 22 that faces the receptacle 12 comprises latching elements 24, which are inserted into a latch opening 26 provided on receptacle 12 to fix the cover 20 to the receptacle 12.

For the permanent fixture of the cover 20 in the final assembly position depicted in FIG. 3, the cover 20 is equipped with a fixing mechanism 28 shaped like a latching hook. In the closed position of the cover 20, the latching hook hooks around the latching lip 30 on the receptacle 12.

As the figures clearly show, the receptacle 12 with the closed peripheral surface includes two projections 32, 34 on its rear side 16 facing in the axial direction, the latch opening 26 being located on projection 32 and the latching lip 30 being located on projection 34.

As FIG. 1 shows, in particular, the peripheral surface of the receptacle 12 comprises a cut-out 36 that extends in a radial direction, which is used to receive a connection section 38 of the sensor 18. The connections of the sensor 18 are therefore brought out at the side of the receptacle 12. The rear side 16 of the receptacle 12 can therefore be fully covered by the cover 20.

The cover 20 comprises, on its side facing the rear side 16, two circumferential contact web sections 40, 42 that serve to make contact with the free end face of receptacle 12 in the final assembly position depicted in FIG. 3.

The sensor 18 is fixed in the mount with the cover 20 in the final assembly position depicted in FIG. 3; the presence of the cover 20 prevents removal of the sensor 18, axially to the rear. The sensor 18 is advantageously held in its final assembly position by the cover 20 by way of axial pre-tensioning in the receptacle 12. Zone Name:

We claim:

1. A sensor mount or a sensor mount for mounting distance sensors on vehicle components, the sensor mount accepting a sensor having an active surface, the sensor mount comprising:

means defining a receptacle for the sensor, said receptacle having an axially front side in a region of which the active surface of the sensor is located when the sensor is inserted into the mount, said receptacle also having a rear side facing away from said front side;

a cover, said cover disposed, structured and dimensioned to partially or fully cover said rear side of said receptacle when the sensor is disposed in the mount to attenuate sensor signals emitted in a rear direction and/or to attenuate reflection signals coming from the rear direction; and a hinge connected between said cover and said receptacle for hinged attachment of said cover to said receptacle.

2. The sensor mount of claim 1, wherein said cover is flexibly attached by said hinge in such a way that it opens said rear side of said receptacle to allow insertion of the sensor into said receptacle and covers said rear side when the sensor is inserted in said receptacle.

3. The sensor mount of claim 1, wherein said hinge is an elastically flexible fixing element molded onto said receptacle and/or onto said cover.

4. The sensor mount of claim 3, wherein said hinge has at least one free end on which a first latching element is disposed for latched fastening to one of a first latch engagement section disposed on said receptacle and a first latch engagement section disposed on said cover.

5. The sensor mount of claim 1, wherein said rear side of said receptacle has a first projection facing in an axial direction with which said hinge cooperates for attaching said cover to said receptacle at said rear side of said receptacle.

6. The sensor mount of claim 1, wherein said cover and said receptacle cooperate to define a releasable or non-releasable locking mechanism.

7. The sensor mount of claim 1, wherein said receptacle is attached to a fixing section of the mount.

8. The sensor mount of claim 1, wherein a peripheral surface of said receptacle is largely closed.

9. The sensor mount of claim 8, wherein said peripheral surface of said receptacle has a cut-out that extends in a radial direction for a connection section of the sensor.

10. The sensor mount of claim 1, wherein said cover comprises, at least in sections, a circumferential contact web for making contact with a free end face of said receptacle.

11. The sensor mount of claim 1, wherein said cover comprises a latching hook and said receptacle comprises a projection defining a latching hook engaging said latching lip when said cover closes said receptacle.

* * * * *